US012223752B2

(12) United States Patent
Machek et al.

(10) Patent No.: US 12,223,752 B2
(45) Date of Patent: Feb. 11, 2025

(54) DATA ACQUISITION IN CHARGED PARTICLE MICROSCOPY

(71) Applicant: FEI Company, Hillsboro, OR (US)

(72) Inventors: Ondrej Machek, Brno (CZ); Pavel Potocek, Eindhoven (CZ); Tereza Konečná, Brno (CZ)

(73) Assignee: FEI Company, Hillsboro, OR (US)

( * ) Notice: Subject to any disclaimer, the term of this patent is extended or adjusted under 35 U.S.C. 154(b) by 576 days.

(21) Appl. No.: 17/491,260

(22) Filed: Sep. 30, 2021

(65) Prior Publication Data

US 2023/0099947 A1 Mar. 30, 2023

(51) Int. Cl.
  *G06V 20/69* (2022.01)
  *G01N 23/04* (2018.01)
  *G06F 18/214* (2023.01)
  *G06N 3/08* (2023.01)
  *G06T 3/4053* (2024.01)
  *G06V 10/22* (2022.01)

(52) U.S. Cl.
  CPC .......... *G06V 20/695* (2022.01); *G06F 18/214* (2023.01); *G06N 3/08* (2013.01); *G06T 3/4053* (2013.01); *G06V 10/235* (2022.01); *G06V 20/693* (2022.01); *G01N 23/04* (2013.01)

(58) Field of Classification Search
  CPC .. G06V 20/695; G06V 10/235; G06V 20/693; G06F 18/214; G06N 3/08; G06T 3/4053; G01N 23/04
  See application file for complete search history.

(56) References Cited

U.S. PATENT DOCUMENTS

| 8,350,237 B2 | 1/2013 | Tanner |
| 10,256,072 B2 | 4/2019 | Stevens et al. |
| 10,928,335 B2 | 2/2021 | Potocek |
| 2009/0304244 A1* | 12/2009 | Kolatt .................. G01N 1/30 382/128 |

(Continued)

FOREIGN PATENT DOCUMENTS

WO WO-2020222441 A1 11/2020

OTHER PUBLICATIONS

Barnett R., et al., "Advanced Segmentation for Industrial Materials," Zeiss, Nov. 2018, pp. 1-10.

(Continued)

*Primary Examiner* — Casey L Kretzer

(57) ABSTRACT

Disclosed herein are charged particle microscopy (CPM) support systems, as well as related methods, computing devices, and computer-readable media. For example, in some embodiments, a CPM support apparatus may include: first logic to cause a CPM to generate a single image of a first portion of a specimen; second logic to generate a first mask based on one or more regions-of-interest provided by user annotation of the single image; and third logic to train a machine-learning model using the single image and the one or more regions-of-interest. The first logic may cause the CPM to generate multiple images of corresponding multiple additional portions of the specimen, and the second logic may, after the machine-learning model is trained using the single image and the one or more regions-of-interest, generate multiple masks based on the corresponding images of the additional portions of the specimen using the machine-learning model without retraining.

15 Claims, 7 Drawing Sheets

(56) References Cited

U.S. PATENT DOCUMENTS

2020/0111206 A1    4/2020  Yati
2020/0327667 A1*   10/2020 Arbel .................. G06V 10/764
2021/0073992 A1    3/2021  Konishi et al.

OTHER PUBLICATIONS

EP22199037.7, Extended European Search Report, Feb. 20, 2023, 8 pages.
Liang Y., et al., "Video Object Segmentation with Adaptive Feature Bank and Uncertain-Region Refinement," 34th Conference on Neural Information Processing Systems (NeurIPS), 2020, pp. 1-12.
Manser R., et al., "Zeiss Zen Intellesis Machine Learning Approaches for Easy and Precise Image Segmentation," Zeiss, Jul. 2018, pp. 1-7.
Zeiss: "Zeiss Zen Intellesis for Materials Science your Imaging Software for Machine Learning," accessed Jul. 2, 2021, 2 pages.
Zeiss: "Zeiss Zen Intellesis Image Segmentation for 2D and 3D Datasets," accessed Jul. 2, 2021, 2 pages.

* cited by examiner

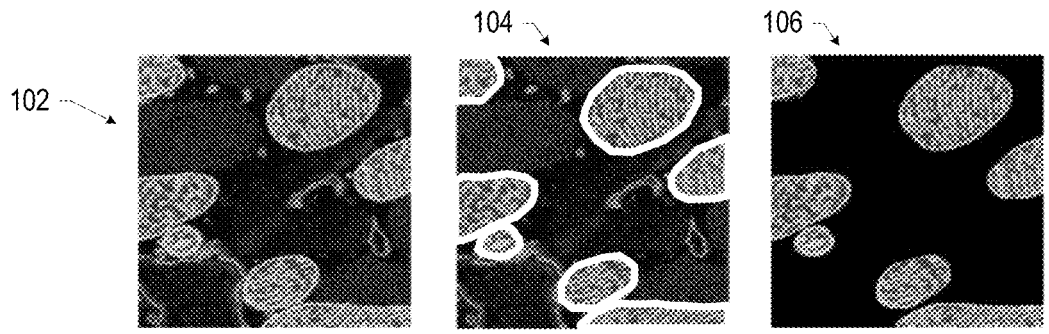

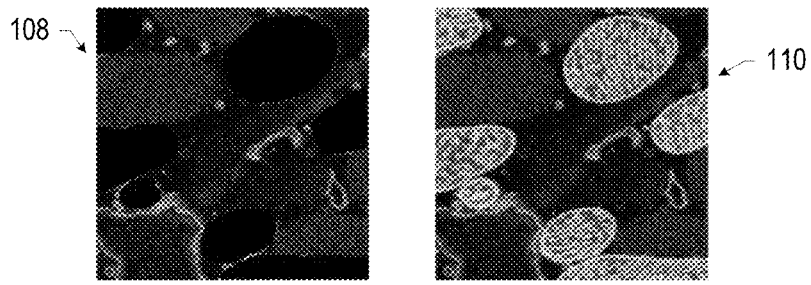

Cause a charged particle microscope to generate a single image of a first portion of a specimen
2002

Generate a first mask based on one or more regions-of-interest provided by user annotation of the single image
2004

Train a machine-learning computational model using the single image and the one or more regions-of-interest
2006

Generate multiple images of corresponding multiple portions of the specimen
2008

Using the trained machine-learning computational model without retraining, generate multiple corresponding masks based on the multiple images of the multiple portions of the specimen
2010

FIG. 5

DATA ACQUISITION IN CHARGED PARTICLE MICROSCOPY

BACKGROUND

Microscopy is the technical field of using microscopes to better view objects that are difficult to see with the naked eye. Different branches of microscopy include, for example, optical microscopy, charged particle (e.g., electron and/or ion) microscopy, and scanning probe microscopy. Charged particle microscopy involves using a beam of accelerated charged particles as a source of illumination. Types of charged particle microscopy include, for example, transmission electron microscopy, scanning electron microscopy, scanning transmission electron microscopy, and ion beam microscopy.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIGS. 3A-3E illustrate stages in a CPM data acquisition process that may be performed by a CPM data acquisition module, in accordance with various embodiments.

FIGS. 5-7 are flow diagrams of example method of performing CPM data acquisition, in accordance with various embodiments.

DETAILED DESCRIPTION

Figure 1:
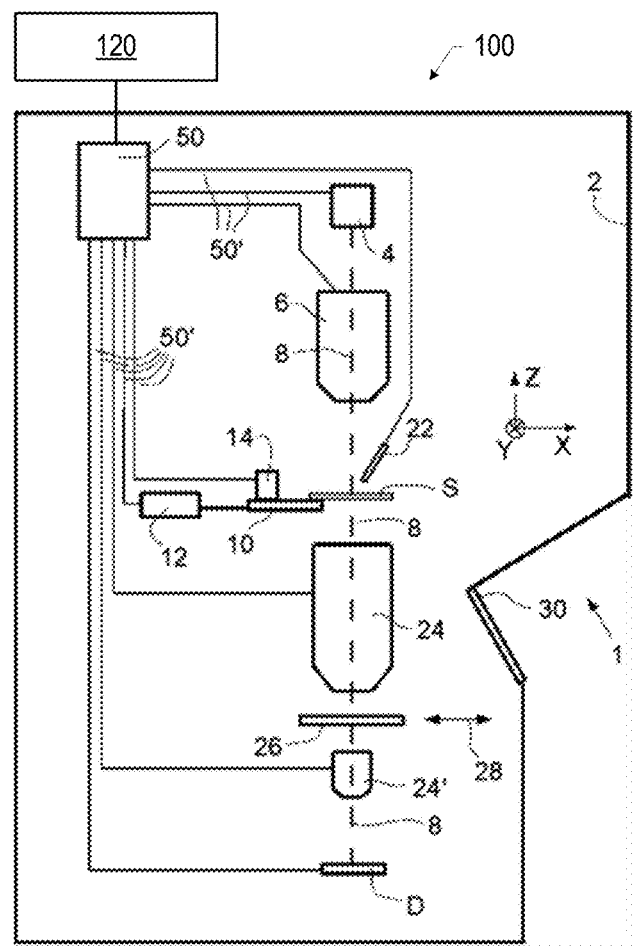
FIG. 1 illustrates a charged particle microscope (CPM) system configured for data acquisition in accordance with the embodiments disclosed herein.

Disclosed herein are charged particle microscopy (CPM) support systems, as well as related methods, computing devices, and computer-readable media. For example, in some embodiments, a CPM support apparatus may include: first logic to cause a CPM to generate a single image of a first portion of a specimen; second logic to generate a first mask based on one or more regions-of-interest provided by user annotation of the single image; and third logic to train a machine-learning model using the single image and the one or more regions-of-interest. The first logic may cause the CPM to generate multiple images of corresponding multiple additional portions of the specimen, and the second logic may, after the machine-learning model is trained using the single image and the one or more regions-of-interest, generate multiple masks based on the corresponding images of the additional portions of the specimen using the machine-learning model without retraining.

The CPM data acquisition support embodiments disclosed herein may achieve improved performance relative to conventional approaches. For example, the CPM data acquisition techniques disclosed herein may dramatically improve imaging throughput without requiring a heavy investment of the time of skilled users to generate large training corpuses. The embodiments disclosed herein thus provide improvements to CPM technology (e.g., improvements in the data acquisition technology supporting such scientific instruments, among other improvements).

The embodiments disclosed herein may achieve increased acquisition speed, reduced data storage requirements, and/or reduced radiation damage to specimens relative to conventional approaches. For example, conventional approaches typically utilize conventional image processing techniques or machine-learning techniques that require hundreds or thousands of sets of input-output pairs for training. However, these approaches suffer from a number of technical problems and limitations. For example, conventional image processing techniques often fail to accurately recognize features-of-interest (and thus require significant supervision by experienced CPM users), and conventional machine-learning techniques require a significant upfront investment of time and energy to generate an adequate training set (an intensive process which must be repeated for every feature-of-interest).

Various ones of the embodiments disclosed herein may improve upon conventional approaches to achieve the technical advantages of reduced acquisition time and/or overall radiation dose by generating selective imaging masks based on a small number of training sets provided by a user. Such technical advantages are not achievable by routine and conventional approaches, and all users of systems including such embodiments may benefit from these advantages (e.g., by assisting the user in the performance of a technical task, such as the identification of features-of-interest in a CPM specimen, by means of a guided human-machine interaction process). The technical features of the embodiments disclosed herein are thus decidedly unconventional in the field of CPM data acquisition, as are the combinations of the features of the embodiments disclosed herein. The computational and user interface features disclosed herein do not only involve the collection and comparison of information, but apply new analytical and technical techniques to change the operation of CPM systems. The present disclosure thus introduces functionality that neither a conventional computing device, nor a human, could perform. Accordingly, the embodiments of the present disclosure may serve a technical purpose, such as controlling charged particle microscopy systems and processes. In particular, the present disclosure provides technical solutions to technical problems, including but not limited to faster data acquisition in CPM systems.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 depicts an embodiment of a CPM system 100 including a CPM 1 coupled to a display device 120. In some embodiments, the CPM system 100 may be a slice-and-view volume acquisition system or a tilt-series acquisition system. The CPM 1 may include any suitable type of CPM, such as a transmission electron microscope (TEM), a scanning electron microscope (SEM), a scanning transmission electron microscope (STEM), a cryo-electron microscope (cryoEM), an ion beam microscope, or a dual beam microscope (e.g., a focused ion beam scanning electron microscope (FIB-SEM). The CPM 1 may include an enclosure 2 having a charged particle source 4 therein. In some embodiments, the enclosure 2 may be a vacuum enclosure, while in other embodiments, a particular gaseous environment may be maintained within the enclosure 2 (e.g., for "environmental STEM" applications). The charged particle source 4 may be, for example, an electron source (e.g., a Schottky gun), a positive ion source (e.g., a gallium ion source or a helium ion source), a negative ion source, a proton source, or a positron source. The charged particle source 4 may produce a beam of charged particles that traverses an illuminator 6 that directs and/or focuses the particles onto a region of a specimen S. The illuminator 6 may also perform aberration mitigation, cropping, and/or filtering of the charged particles output by the charged particle source 4. The illuminator 6 may have an axis 8, and may include one or more subcomponents, such as electrostatic lenses, magnetic lenses, scan deflectors, correctors (e.g., stigmators), and/or a condenser system.

The specimen S may be held on a specimen holder 10 that can be positioned in multiple degrees of freedom by a positioning device 12. For example, the specimen holder 10 may include a finger that can be translated in the x-y plane and may also be rotated about an axis in the x-y plane to achieve different tilt angles of the specimen with respect to the axis 8 of the beam of charged particles from the illuminator 6. Such movement may allow different regions of the specimen S to be irradiated, scanned, and/or inspected at different angles by the charged particle beam traveling along axis 8 (and/or may allow scanning motion to be performed, as an alternative to beam scanning). A cooling device 14 may be in thermal contact with the specimen holder 10, and may be capable of maintaining the specimen holder 10 at cryogenic temperatures (e.g., using a circulating cryogenic coolant to achieve and maintain a desired low temperature) when desired.

The focused charged particle beam, traveling along axis 8, may interact with the specimen S in such a manner as to cause various types of radiation to emanate from the specimen S. Such radiation may include secondary charged particles (e.g., secondary electrons), backscattered charged particles (e.g., backscattered electrons), x-rays, and/or optical radiation (e.g., cathodoluminescence). One or more of these radiation types, or other radiation types, may be detected by a detector 22. In some embodiments, the detector 22 may include a combined scintillator/photomultiplier or EDX detector, for example. Alternately or additionally, charged particles may traverse the specimen S, emerge from it, and continue to propagate (substantially, though generally with some deflection/scattering) along axis 8. Such transmitted electrons may enter an imaging system 24 that serves as a combined objective/projection lens and which may include a variety of electrostatic and/or magnetic lenses, deflectors, correctors (e.g., stigmators), etc., as suitable. In a non-scanning mode, the imaging system 24 may focus the transmitted electrons onto a fluorescent screen 26 which, if desired, can be retracted or otherwise withdrawn (as schematically indicated by arrows 28) so as to move it out of the way of the axis 8. An image of a portion of the specimen S may be formed by the imaging system 24 on the screen 26, and this may be viewed through the viewing port 30 located in a suitable portion of the enclosure 2 of the CPM 1. The retraction mechanism for the screen 26 may, for example, be mechanical and/or electrical in nature, and is not depicted here.

Alternatively or additionally to viewing an image on a screen 26, a charged particle detector D may be used. In such embodiments, an adjuster lens 24' may shift the focus of the charged particles emerging from the imaging system 24 and redirect them onto the charged particle detector D (rather than onto the plane of the retracted screen 26, as discussed above). At the charged particle detector D, the charged particles may form an image (e.g., a diffractogram) that can be processed by the controller 50 and displayed on the display device 120. In STEM mode, an output from the detector D can be recorded as a function of the (x,y) scanning beam position and tilt angle of the specimen S, and an image can be constructed that is a map of the detector output. Generally, a CPM 1 may include one or more detectors arranged as desired; examples of such detectors may include photomultipliers (e.g., solid-state photomultipliers), photodiodes, complementary metal oxide semiconductor (CMOS) detectors, charge-coupled device (CCD) detectors, and photovoltaic cells used in conjunction with a scintillator film, among others. The present disclosure will use the term "image" to refer to a set of data generated by one or more detectors of a CPM, and such images may include a scalar value at each pixel, a vector value at each pixel, or any other suitable arrangement of information.

The controller 50 may be connected to various illustrative components via control lines 50' (e.g., buses). The controller 50 may provide a variety of functions, such as synchronizing actions, providing setpoints, processing signals, performing calculations, and displaying messages/information on the display device 120. Although the controller 50 is depicted in FIG. 1 as being inside an enclosure 2 of the CPM 1, this is simply illustrative, and the controller 50 may be located inside the enclosure 2, outside the enclosure 2, or may be distributed between components inside the enclosure 2 and outside the enclosure 2. For example, in some embodiments, some operations of the controller 50 may be performed by hardware located inside the enclosure 2, while other operations of the controller 50 may be performed by hardware (e.g., a computing device, such as a laptop or desktop computer) located outside the enclosure 2.

Figure 2:
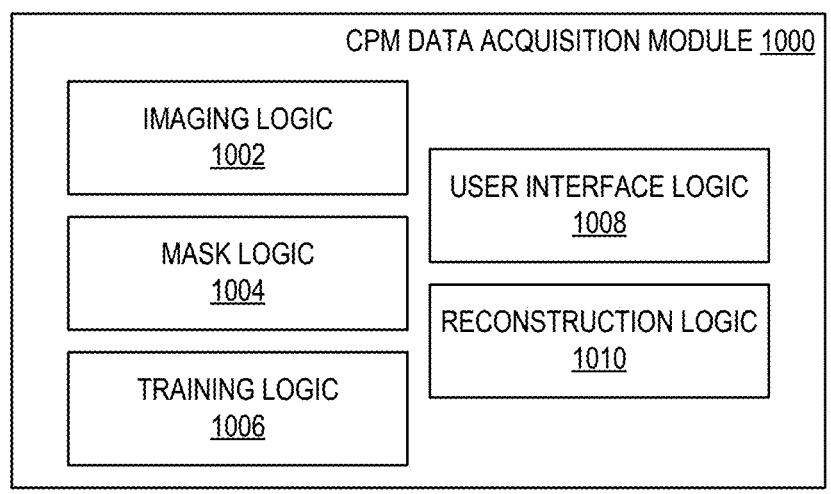
FIG. 2 is a block diagram of an example CPM data acquisition module for performing data acquisition, in accordance with various embodiments.

FIG. 2 is a block diagram of a CPM data acquisition module 1000 for performing data acquisition, in accordance with various embodiments. The CPM data acquisition module 1000 may be part of the controller 50 of the CPM system 100 of FIG. 1. The CPM data acquisition module 1000 may be implemented by circuitry (e.g., including electrical and/or optical components), such as a programmed computing device. The logic of the CPM data acquisition module 1000 may be included in a single computing device, or may be distributed across multiple computing devices that are in communication with each other as appropriate. Examples of computing devices that may, singly or in combination, implement the CPM data acquisition module 1000 are discussed herein with reference to the computing device 4000 of FIG. 9, and examples of systems of interconnected computing devices, in which the CPM data acquisition module 1000 may be implemented across one or more of the computing devices, is discussed herein with reference to the scientific instrument support system 5000 of FIG. 10.

The CPM data acquisition module 1000 may include imaging logic 1002, mask logic 1004, training logic 1006, user interface (UI) logic 1008, and reconstruction logic 1010. As used herein, the term "logic" may include an apparatus that is to perform a set of operations associated with the logic. For example, any of the logic elements included in the CPM data acquisition module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The imaging logic 1002 may cause a CPM (e.g., the CPM 1 of FIG. 1) to generate an image of a portion of a specimen (e.g., the specimen S of FIG. 1). For example, the imaging logic 1002 may generate images of different portions of a specimen at different depths (e.g., having different values in the (z)-direction). The imaging logic 1002 may be configurable so as to capture different types of images. For example, in some embodiments, the imaging logic 1002 may be configurable to capture low-resolution images and high-resolution images. The terms "high resolution" and "low resolution" are used relatively here to indicate that the resolution or other information content of a high-resolution image is greater than a resolution or other information content of a low-resolution image. A low-resolution image of a specimen may require a lower radiation dose and/or acquisition time than a high-resolution image of the specimen; in some embodiments, the imaging logic 1002 may cause different hardware (e.g., one or more different detectors) to be used to capture the high-resolution image than the low-resolution image. In some embodiments, as discussed further below, the imaging logic 1002 may cause a CPM to generate a low-resolution image of a portion of a specimen, then that low-resolution image may be used (e.g., by the mask logic 1004) to generate a mask that will be applied when the imaging logic 1002 causes the CPM to generate a high-resolution image of the portion of the specimen, such that only a subset of the field-of-view of the CPM is captured at high resolution. In some embodiments, the images generated by a CPM at the instruction of the imaging logic 1002 may include bright-field images, annular bright-field (ABF) images, integrated differential phase contrast (iDPC) images, or high-angle annular dark-field (HAADF) images. FIG. 3A depicts a graphical representation 102 of an image (e.g., a "low-resolution" image) of a portion of a specimen that may be generated by the imaging logic 1002.

The mask logic 1004 may receive (e.g., from the imaging logic 1002) an image of a portion of a specimen (e.g., the specimen S of FIG. 1) and may generate an associated mask for later imaging by the CPM (e.g., the CPM 1 of FIG. 1) based on the received image. As used herein, a "mask" may be a data set that indicates to a CPM (e.g., the CPM 1 of FIG. 1) which regions in its total field-of-view of a portion of a specimen are to be imaged in a later imaging operation. For example, a mask may indicate which of the squares in a "full-frame" grid of the field-of-view are to be imaged in a later imaging operation. A mask may thus correspond to a subset of the full-frame field-of-view of a CPM when imaging a portion of a specimen. In some embodiments, the mask logic 1004 may identify regions-of-interest in a received, lower-resolution image (generated by the imaging logic 1002) of a portion of a specimen, and may generate a mask that identifies the regions-of-interest as regions that are to be imaged by the CPM in a later, higher-resolution imaging of the portion of the specimen. FIG. 3B depicts a graphical representation 104 of an example set of regions-of-interest (bordered in white) that the mask logic 1004 may identify in the graphical representation 102 of FIG. 3A. The regions-of-interest may include features-of-interest in the graphical representation 102, and the mask logic 1004 may identify the regions-of-interest through initial manual input by the user and subsequently by application of machine-learning techniques, as discussed further below. The graphical representation 104 may correspond to a mask for subsequent imaging of the portion of the specimen imaged in the graphical representation 102, and may be generated by the mask logic 1004. In particular, in the graphical representation 104, the areas bordered in white indicate the areas in a CPM's field-of-view that will be imaged in a later round of imaging (e.g., higher resolution imaging) of the portion of the specimen, and the areas in black indicate the areas in the CPM's field-of-view that will not be imaged in the later round of imaging. In the graphical representation 104, the regions-of-interest may exactly correspond with the to-be-imaged regions of the mask, but in other embodiments, the mask associated with a set of regions-of-interest may be larger than the union of the regions-of-interest (e.g., by a fixed number or percentage of pixels around individual regions-of-interest). Note that the graphical representations 102 and 104 of FIG. 3A and FIG. 3B, respectively, are each associated with a particular portion of a specimen; graphical representations like the graphical representations 102 and 104 may be generated for each of multiple portions of the specimen (e.g., at different depths in the specimen).

The mask generated by the mask logic 1004 may indicate to the CPM that the portions of its field-of-view corresponding to the regions-of-interest are to be imaged in a later imaging operation of a portion of a specimen, and the portions of its field-of-view not corresponding to the regions-of-interest are not to be imaged in the later imaging operation. Reducing the area of the field-of-view that is to be imaged may reduce the radiation to which the specimen is exposed and may reduce the acquisition time of the later imaging operation, relative to an imaging operation which the entire field-of-view is imaged. In some embodiments, the mask generated by the mask logic may have a greater resolution than the low-resolution image used by the mask logic 1004 to generate the mask.

The mask logic 1004 may identify the regions-of-interest in a received image using a machine learning technique that uses, as training data, an image of a portion of a specimen and a user's identification of regions-of-interest in the image. In particular, at the outset of imaging a particular specimen, the mask logic 1004 may perform a first, low-resolution imaging round of a first portion of the specimen, and then may provide a graphical representation of the corresponding low-resolution image (e.g., like the graphical representation 102 of FIG. 3A) to a user (e.g., via the UI logic 1008, discussed further below). The user may then annotate the graphical representation of the low-resolution image of the first portion of the specimen with an indication of which regions of the low-resolution image are regions-of-interest (e.g., by "drawing" the white borders of the graphical representation 104 of FIG. 3B on the graphical representation 102 of FIG. 3A). The mask logic 1004 may provide the low-resolution image of the first portion of the specimen and the identification of the regions-of-interest in the low-resolution image of the first portion of the specimen to the training logic 1006 (discussed further below), which may train a machine-learning computational model (e.g., a neural network model previously trained on images that may not be CPM images, as discussed further below) to identify regions-of-interest in subsequently acquired low-resolution images of other portions of the specimen (e.g., portions of the specimen at different (z) depths); the mask logic 1004 may use the regions-of-interest generated by the machine-learning computational model to generate a mask (like that of the graphical representation 104 of FIG. 3B) associated with a portion of the specimen. The regions-of-interest identified by the machine-learning computational model may exactly correspond with the to-be-imaged regions of the mask generated by the mask logic 1004, but in other embodiments, the mask associated with a set of regions-of-interest generated by a machine-learning computational model may be larger than the union of the regions-of-interest (e.g., by a fixed number or percentage of pixels around individual regions-of-interest). In some embodiments, when there are multiple different types of features-of-interest in a specimen (e.g., different components of a biological cell), the mask logic 1004 may use multiple corresponding machine-learning computational models to recognize each of the features-of-interest in low-resolution images of the specimen; in other embodiments, a single machine-learning computational model may be trained to recognize the multiple different features-of-interest. For ease of discussion, a singular "machine-learning computational model" may be discussed herein as part of the mask logic 1004, but mask logic 1004 may implement any desired number of machine-learning computational models (e.g., corresponding to different features-of-interest in a specimen).

In some embodiments, the user may only manually identify regions-of-interest (corresponding to features-of-interest) in only a single low-resolution image of a portion of the specimen, or a small number of images of different portions of the specimen (e.g., fewer than 10), with that manual identification being provided to the training logic 1006 to train a machine-learning computational model, before the mask logic 1004 can successfully use the trained machine-learning computational model to identify similar features-of-interest in other portions of the specimen. This may be contrasted with conventional machine-learning approaches, in which hundreds or thousands of manually annotated or otherwise previously annotated images of a particular specimen or for particular features-of-interest are needed to successfully perform image segmentation tasks involving that specimen or features-of-interest. The mask logic 1004 may instead use a machine-learning computational model that has previously been trained for generic image recognition using a training corpus that does not include images of the specimen. For example, in some embodiments in which the specimen includes a particular biological sample, the training corpus may not include any images of that biological sample or similar biological samples, but may instead include substantially different images (e.g., images of stoplights, images of bicycles, etc.). Using a machine-learning computational model that has previously been trained for generic image recognition and segmentation (e.g., using publicly available data sets of images that are wholly different from CPM images), and then training that machine-learning computational model on a single or small number of CPM images annotated with regions-of-interest, can yield acceptable performance in identifying similar regions-of-interest in other CPM images of the specimen, particularly when the machine-learning computational model is trained with an error function that represents a preference for over-identification of regions-of-interest rather than under-identification of regions-of-interest (i.e., a preference for "false positives" instead of "false negatives"). Such a preference may also be advantageous, for example, in settings in which a previous portion of the sample may be milled away or otherwise removed to image a next portion of the sample, and thus there may be no opportunity to re-image the previous portion (e.g., in auto slice-and-view volume acquisition settings). Because the training of conventional machine-learning computational models represents a significant burden to users, slowing adoption of machine-learning techniques, mask logic 1004 that includes a machine-learning computational model that generates over-inclusive masks (i.e., masks that indicate to image regions having the desired feature-of-interest and also regions not having the desired feature-of-interest) may result in an overall technical improvement in CPM imaging, achieving many of the benefits of selective high-resolution imaging (e.g., reduced radiation dose and acquisition time, as discussed above) with a substantially reduced user burden (the annotation of a single or small number of low-resolution images).

After the mask logic 1004 generates a mask associated with a portion of a specimen (based on a low-resolution image of the portion of the specimen, as discussed above), the imaging logic 1002 may use the mask to perform a high-resolution imaging round of the portion of the specimen. During this high-resolution imaging round, only a subset of the field-of-view of the portion of the specimen may be imaged; FIG. 3C depicts a graphical representation 106 of a high-resolution image of the portion of the specimen imaged (at low resolution) in FIG. 3A, corresponding to the mask of the graphical representation 104 of FIG. 3B. In some embodiments, this high-resolution imaging round may include the features-of-interest in the portion of the specimen, and may also include regions of the portion of the specimen that do not include the features-of-interest (e.g., because the machine-learning computational model implemented by the mask logic 1004 is trained to preferentially generate false positives instead of false negatives). In some embodiments, the imaging logic 1002 (or the UI logic 1008) may create a combined image for a portion of the specimen by rescaling the low-resolution image (e.g., by resampling) and subtracting the masked portions (e.g., as shown in the graphical representation 108 of FIG. 3D), and then superimposing the high-resolution image on the result to form a combined image (e.g., as shown in the graphical representation 110 of FIG. 3E) that includes low-resolution and high-resolution information about the portion of the specimen.

When two different portions of a specimen are "adjacent" to each other (e.g., adjacent milled or mechanically sliced portions, or adjacent angular captures in a tilt series), low-resolution images of these portions are expected to be similar, as are the masks generated by the mask logic 1004. If the low-resolution images, or associated masks, of these portions are substantially different, the mask logic 1004 may use this condition to determine that it is unlikely that the trained machine-learning computational model will generate an acceptably correct output for both portions, and thus the mask logic 1004 may perform additional or alternative operations to generate a mask for one or more of the portions. In particular, in some embodiments, the mask logic 1004 may compare the low-resolution images generated by the imaging logic 1002, or the masks generated by the mask logic 1004 based on the output of the machine-learning computational model, for adjacent or otherwise physically proximate portions of the specimen, and may determine whether differences between the low-resolution images (or corresponding masks) meet one or more difference criteria. When comparing masks for different portions of the specimen, the difference criteria may include the difference in percentage area of the regions-of-interest for the different portions exceeding a threshold, an amount of overlap in regions-of-interest for the different portions falling below a threshold, and/or any other suitable difference criteria. When comparing low-resolution images for different portions of the specimen, the difference criteria may include comparing any suitable image similarity metrics to a threshold (e.g., when the mean-squared intensity difference between the low-resolution images exceeds a threshold). If differences between the low-resolution images (or corresponding masks) of two physically proximate portions of the specimen meet one or more such difference criteria, the mask logic 1004 may perform one or more corrective operations, such as asking the user to annotate one or both of the low-resolution images (and then providing the newly annotated images to the training logic 1006 for retraining of the machine-learning computational model), increasing the size of the regions-of-interest in one or more of the masks to increase the likelihood of capturing the features-of-interest, prompting a user to evaluate one or more of the proposed masks and accept, reject, or correct the proposed masks, or any other suitable corrective or mitigative action.

As discussed above, the training logic 1006 may be configured to train the machine-learning computational model of the mask logic 1004 on a set of training data. The training logic 1006 may also be configured to retrain the machine-learning computational model as additional training data is received. As known in the art, the training data may include sets of input-output pairs (e.g., one or more pairs of input low-resolution images of an portion of a specimen and corresponding regions-of-interest in the low-resolution image of the portion of the specimen), and the training logic 1006 may use this training data to train the machine-learning computational model (e.g., by adjusting weights and other parameters of the machine-learning computational model) in accordance with any suitable technique. Any suitable machine-learning computational model may be used, such as a neural network model. For example, the mask logic 1004 may implement a multi-layer neural network model, such as a convolutional neural network model (e.g., a ResNet model, such as ResNet-50). In some embodiments, the mask logic 1004 may implement a video object segmentation model that includes a multi-layer neural network model, such as the video object segmentation model described in Liang et al., "Video Object Segmentation with Adaptive Feature Bank and Uncertain-Region Refinement," 34th Conference on Neural Information Processing Systems (NeurIPS 2020), Vancouver, Canada. The machine-learning computational model of the mask logic 1004 may, in advance of imaging of a particular specimen by the CPM, be trained for object recognition/segmentation using a general corpus of images, such as the DAVIS17 data set and/or the YouTube-VOS18 data set.

Figure 4A:
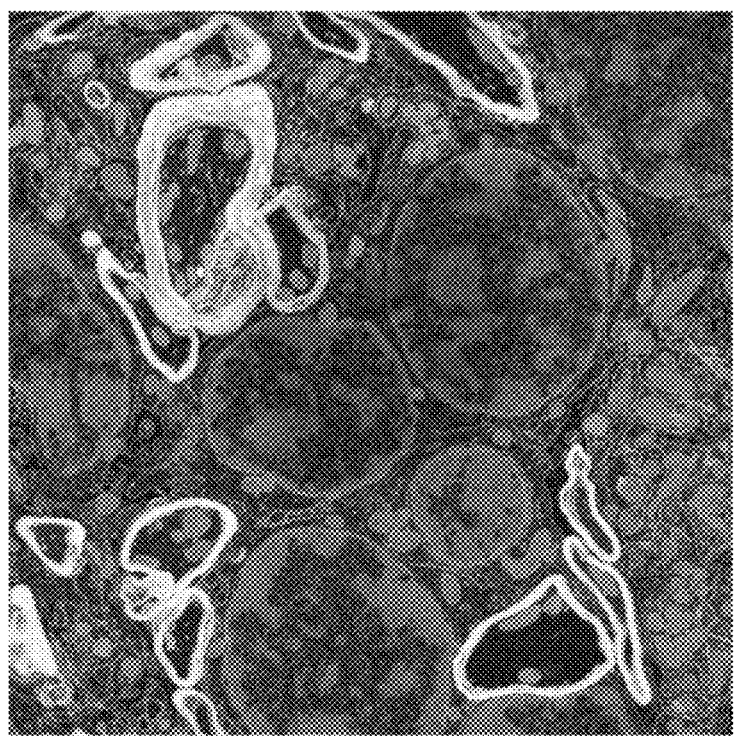
FIGS. 4A and 4B illustrate various stages in a CPM data acquisition process that may be performed by a CPM data acquisition module, in accordance with various embodiments.
Figure 4B:
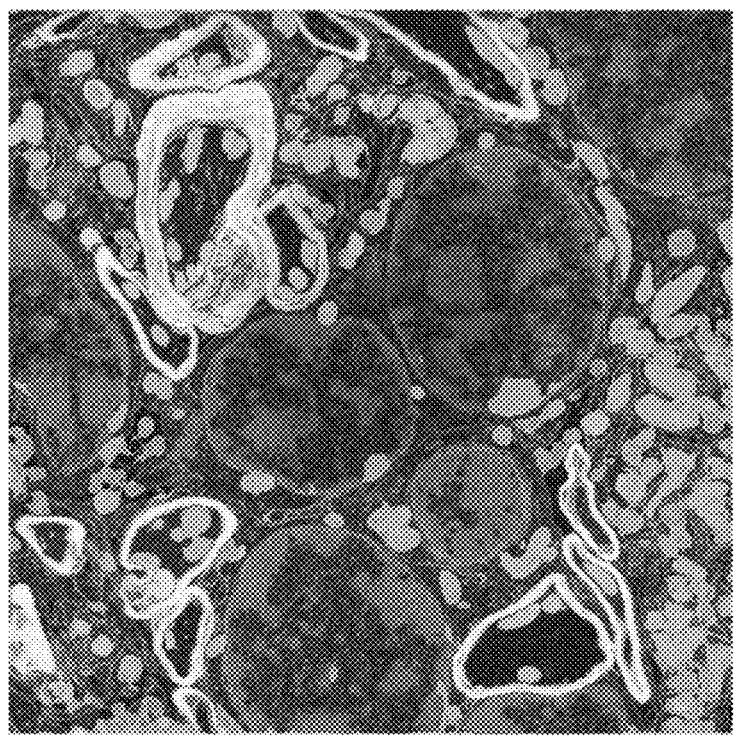

As discussed above, in some embodiments, the user may only manually identify regions-of-interest (corresponding to features-of-interest) in only a single low-resolution image of the specimen, or a small number of images of the specimen (e.g., fewer than 10), with that manual identification being provided to the training logic 1006 to train a machine-learning computational model, before the mask logic 1004 can successfully use the trained machine-learning computational model to identify similar features-of-interest in other portions of the specimen. This is particularly true when the different portions of a specimen are physical proximate to each other such that the features in one portion are very similar to the features in an adjacent portion (analogously to the adjacent frames in video object segmentation). For example, a first portion of a specimen may represent a first plane through the specimen (e.g., a plane formed by mechanically slicing or milling the specimen) and a second portion of the specimen may represent a second plane through the specimen (e.g., another plane formed by mechanically slicing or milling the specimen). Such parallel planes in some embodiments may be spaced apart by a distance between 1 micron and 30 microns (e.g., between 1 micron and 10 microns when the planes are formed by milling, and between 10 microns and 30 microns when the planes are formed by mechanical slicing), and may represent planes spaced apart in the (z)-direction. For example, FIG. 4A depicts a graphical representation 112 of a low-resolution image of a portion of a specimen with two different types of features-of-interest manually identified by a user (e.g., via the UI logic 1008), and FIG. 4B depicts a graphical representation 114 of a low-resolution image of an adjacent portion of the specimen (e.g., a plane of the specimen parallel to the plane of the graphical representation 112) with two different types of regions-of-interest (corresponding to the two different types of features-of-interest of FIG. 4A) generated by the machine-learning computational model of the mask logic 1004 after the training logic 1006 trained the machine-learning computational model on the manually annotated low-resolution image of FIG. 4A. The features of the portion of the specimen represented in FIG. 4B may be very similar to the features of the portion of the specimen represented in FIG. 4A due to their proximity in the specimen (e.g., between 1 micron and 30 microns apart), and the over-inclusive error of the machine-learning computational model of the mask logic 1004 may result in an identification of regions-of-interest in the graphical representation 114 of FIG. 4B that substantially includes the features-of-interest identified in FIG. 4A, as well as additional regions of the portion of the specimen associated with FIG. 4B.

In some embodiments, the training logic 1006 may retrain the machine-learning computational model of the mask logic 1004 once a retraining condition has been met. For example, in some embodiments, the training logic 1006 may retrain the machine-learning computational model of the mask logic 1004 upon accumulation of a threshold number of "new" training data sets (e.g., 20 training data sets). In some embodiments, the training logic 1006 may retrain the machine-learning computational model with whatever retraining data sets are available upon receipt of a retraining command from a user (e.g., via a GUI like the GUI 3000 of FIG. 8). In some embodiments, the training logic 1006 may retrain the machine-learning computational model when one or more performance metrics of the machine-learning computational model (e.g., an error on one or more validation data sets) meet one or more retraining criteria (e.g., the error increases a threshold amount from a previous training round). In some embodiments, the retraining condition may include any one or more of these conditions. New retraining data may be generated by providing one or more additional low-resolution images of portions of the specimen to a user (e.g., via the UI logic 1008) and asking the user to identify the regions-of-interest in the low-resolution images. In some embodiments, retraining of the machine-learning computational model may occur on a calendar schedule (e.g., daily or weekly) and/or after the processing of a certain number of low-resolution images (e.g., every 100 images). Note that, in some embodiments, a mask may be a "negative mask," regions of a field-of-view that should not be imaged; in some such embodiments, the machine-learning computational model of the mask logic 1004 may be trained to recognize features that are not of interest, with the "negative" mask corresponding to the regions of those features.

The UI logic 1008 may provide information to a user and receive inputs from a user (e.g., via a GUI like the GUI 3000 discussed below with reference to FIG. 8). In some embodiments, the UI logic 1008 may cause the display, on a display device (e.g., any of the display devices discussed herein), of a graphical representation of at least some of the low-resolution images associated with a portion of a specimen. For example, FIGS. 3A and 3B are graphical representations 102 and 104, respectively, that may be provided to a user, via a display device (and a GUI, such as the GUI 3000 discussed below with reference to FIG. 8), as part of the data acquisition techniques disclosed herein, in accordance with various embodiments.

In some embodiments, the UI logic 1008 may cause the display, on a display device (e.g., any of the display devices discussed herein), of a graphical representation of at least some of the high-resolution images associated with a portion of a specimen (e.g., the graphical representation 106 of FIG. 3C). In some embodiments, the UI logic 1008 may cause the display, on a display device, of a graphical representation of one or more combined low-resolution/high-resolution images (e.g., the graphical representation 110 of FIG. 3E).

The UI logic 1008 may request and receive inputs from a user, such as user annotations of a low-resolution image, as discussed herein. In some embodiments, the UI logic 1008 may cause the display of one or more performance metrics of the machine-learning computational model of the mask logic 1004 (e.g., a plot of the rate of requests for user annotations versus time, a number of low-resolution images processed by the mask logic 1004 without requesting additional user annotations, etc.). Any other suitable way of displaying a performance metric of the machine-learning computational model may be used.

The imaging logic 1002 may provide the low-resolution and high-resolution images generated by CPM for different portions of the specimen for further processing by reconstruction logic 1010, which may generate a three-dimensional reconstruction of some or all of the specimen based on the images. In some embodiments, the imaging logic 1002 may provide the images directly to the reconstruction logic 1010 (e.g., when the imaging logic 1002 and the reconstruction logic 1010 are implemented as part of a common software package and/or execute on a common computing device), while in other embodiments, the imaging logic 1002 may provide the images in an intermediate form that can be provided later to the reconstruction logic 1010. An example of this latter embodiment may include the imaging logic 1002 exporting the images to a storage device (e.g., networked storage or a physical storage device, such as a Universal Serial Bus (USB) stick) that can be later accessed by the reconstruction logic 1010. In some embodiments, the imaging logic 1002 may be included in a software package that is separate from a software package that includes the reconstruction logic 1010. In some embodiments, the CPM data acquisition module 1000 may provide an auto slice-and-view volume acquisition tool for a CPM or a tilt-series volume acquisition tool for a CPM.

As noted above, the reconstruction logic 1010 may use the images generated by the imaging logic 1002 to generate a three-dimensional reconstruction of the specimen. The reconstruction logic 1010 may use any suitable known techniques for this reconstruction. For example, in various embodiments, the reconstruction logic 1010 may use the images to perform a tomographic reconstruction, a weighted back projection (WBP), a simultaneous iterative reconstruction technique (SIRT), a HAADF-energy dispersive spectroscopy (EDS) bimodal tomography (HEBT) technique, a conjugate gradient least squares (CGLS) technique, an expectation maximization (EM) technique, a simultaneous algebraic reconstruction technique (SART), a diffraction tomography technique, or a combination thereof.

Figure 6:
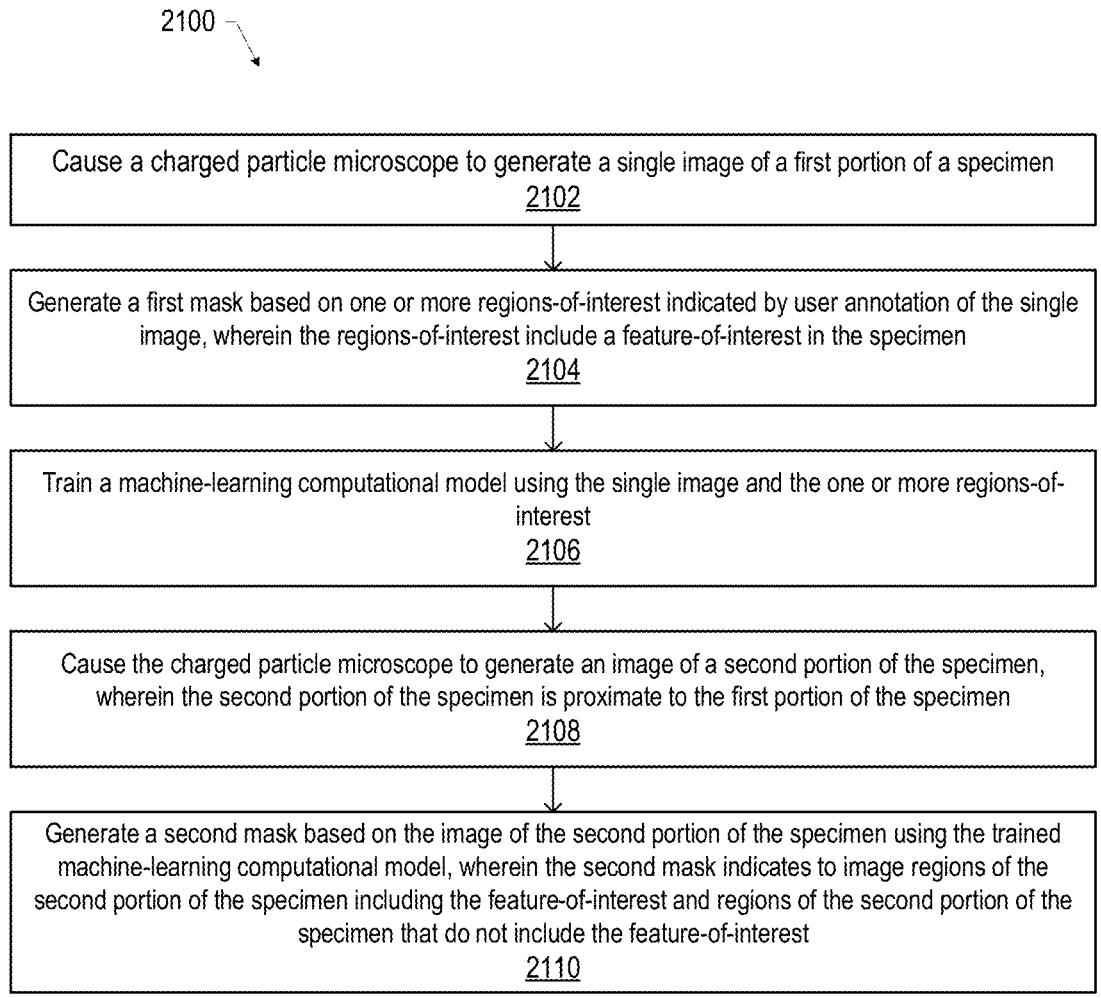
Figure 7:
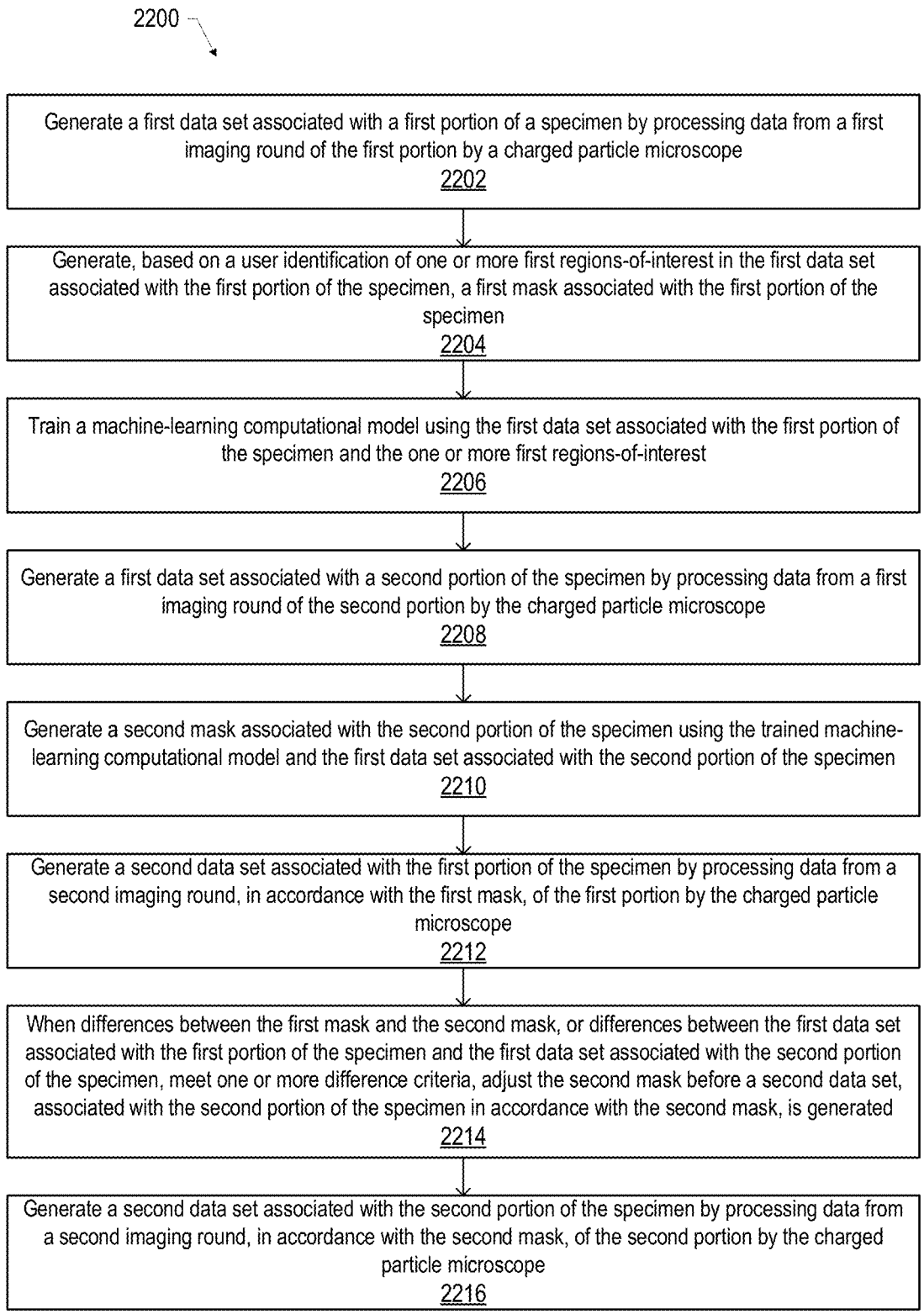

FIGS. 5, 6, and 7 are flow diagrams of methods 2000, 2100, and 2200, respectively, of performing CPM data acquisition, in accordance with various embodiments. Although the operations of the methods 2000, 2100, and 2200 may be illustrated with reference to particular embodiments disclosed herein (e.g., the CPM data acquisition modules 1000 discussed herein with reference to FIG. 2, the GUI 3000 discussed herein with reference to FIG. 8, the computing devices 4000 discussed herein with reference to FIG. 9, and/or the scientific instrument support system 5000 discussed herein with reference to FIG. 10), the methods 2000, 2100, and 2200 may be used in any suitable setting to perform any suitable data acquisition or other support operations. Operations are illustrated once each and in a particular order in FIGS. 5-7, but the operations may be reordered and/or repeated as desired and appropriate (e.g., different operations performed may be performed in parallel, as suitable).

In the method 2000 of FIG. 5, at 2002, a CPM may be caused to generate a single image of a first portion of a specimen. For example, the imaging logic 1002 of a CPM data acquisition module 1000 may perform the operations of 2002 (e.g., to generate a low-resolution image of a portion of a specimen).

At 2004, a first mask may be generated based on one or more regions-of-interest provided by user annotation of the single image. For example, the mask logic 1004 of a CPM data acquisition module 1000 may perform the operations of 2004 in response to user annotations received via the UI logic 1008.

At 2006, a machine-learning computational model may be trained using the single image and the one or more regions-of-interest. For example, the training logic 1006 of a CPM data acquisition module 1000 may perform the operations of 2006 to train a machine-learning computational model on the single image and its associated annotations. As discussed above, in some embodiments, the machine-learning computational model may have been previously trained on images not of the specimen.

At 2008, multiple images of corresponding multiple portions of the specimen may be generated. For example, the imaging logic 1002 of a CPM data acquisition module 1000 may perform the operations of 2008 (e.g., to acquire images of sequentially "adjacent" portions of a specimen, such as milled or mechanically sliced planes or adjacent angles in a tilt series).

At 2010, multiple corresponding masks based on the multiple images of the multiple portions of the specimen may be generated using the trained machine-learning computational model without retraining. For example, the mask logic 1004 of a CPM data acquisition module 1000 may perform the operations of 2010 (e.g., to generate masks associated with different portions of the specimen without retraining the machine-learning computational model).

In the method 2100 of FIG. 6, at 2102, a charged particle microscope may be caused to generate a single image of a first portion of the specimen. For example, the imaging logic 1002 of a CPM data acquisition module 1000 may perform the operations of 2102 (e.g., to generate a low-resolution image of a portion of a specimen).

At 2104, a first mask may be generated based on one or more regions-of-interest indicated by user annotation of the single image, wherein the regions-of-interest include a feature-of-interest in the specimen. For example, the mask logic 1004 of a CPM data acquisition module 1000 may perform the operations of 2004 in response to user annotations received via the UI logic 1008.

At 2106, a machine-learning computational model may be trained using the single image and the one or more regions-of-interest. For example, the training logic 1006 of a CPM data acquisition module 1000 may perform the operations of 2106 to train a machine-learning computational model on the single image and its associated annotations. As discussed above, in some embodiments, the machine-learning computational model may have been previously trained on images not of the specimen.

At 2108, the charged particle microscope may be caused to generate an image of a second portion of the specimen, wherein the second portion of the specimen is proximate to the first portion of the specimen. For example, the imaging logic 1002 of a CPM data acquisition module 1000 may perform the operations of 2108 (e.g., to acquire an image of an "adjacent" portion of a specimen, such as a milled or mechanically sliced plane or adjacent angles in a tilt series).

At 2110, a second mask may be generated based on the image of the second portion of the specimen using the trained machine-learning computational model, wherein the second mask indicates to image regions of the second portion of the specimen including the feature-of-interest and regions of the second portion of the specimen that do not include the feature-of-interest. For example, the mask logic 1004 of a CPM data acquisition module 1000 may perform the operations of 2110 (e.g., to generate a mask associated with another portion of the specimen without retraining the machine-learning computational model, with such mask being "over-inclusive," as discussed above).

In the method 2200 of FIG. 7, at 2202, a first data set may be generated associated with a first portion of a specimen by processing data from a first imaging round of the first portion by a charged particle microscope. For example, the imaging logic 1002 of a CPM data acquisition module 1000 may perform the operations of 2202 (e.g., to generate a low-resolution image of a portion of a specimen).

At 2204, a first mask may be generated associated with the first portion of the specimen, wherein the generation of the first mask is based on a user identification of one or more first regions-of-interest in the first data set associated with the first portion of the specimen. For example, the mask logic 1004 of a CPM data acquisition module 1000 may perform the operations of 2204 in response to user annotations received via the UI logic 1008.

At 2206, a machine-learning computational model may be trained using the first data set associated with the first portion of the specimen and the one or more first regions-of-interest. For example, the training logic 1006 of the CPM data acquisition module 1000 may perform the operations of 2206 to train a machine-learning computational model. In some embodiments, the training of the machine-learning computational model at 2206 may include a single input-output pair (e.g., based on a single annotated low-resolution image) or a small number of input-output pairs (e.g., based on 10 or fewer annotated low-resolution images).

At 2208, a first data set may be generated associated with a second portion of the specimen by processing data from a first imaging round of the second portion by the charged particle microscope. For example, the imaging logic 1002 of a CPM data acquisition module 1000 may perform the operations of 2208 (e.g., to generate a low-resolution image of another portion of the specimen).

At 2210, a second mask may be generated associated with the second portion of the specimen using the trained machine-learning computational model and the first data set associated with the second portion of the specimen. For example, the mask logic 1004 of a CPM data acquisition module 1000 may perform the operations of 2210.

At 2212, a second data set may be generated associated with the first portion of the specimen by processing data from a second imaging round, in accordance with the first mask, of the first portion by the charged particle microscope. For example, the imaging logic 1002 of the CPM data acquisition module 1000 may perform the operations of 2212 (e.g., to generate a high-resolution image of the first portion of the specimen in accordance with the first mask).

At 2214, when differences between the first mask and the second mask, or differences between the first data set associated with the first portion of the specimen and the first data set associated with the second portion of the specimen, meet one or more difference criteria, the second mask may be adjusted before a second data set, associated with the second portion of the specimen in accordance with the second mask, is generated. For example, the mask logic 1004 of a CPM data acquisition module 1000 may perform the operations of 2214 (e.g., to assess the differences between the masks and/or or the low-resolution images of the portions of the specimen, and adjust one or more of the masks).

At 2216, a second data set, associated with the second portion of the specimen, may be generated by processing data from a second imaging round, in accordance with the second mask, of the second portion by the charged particle microscope. For example, the imaging logic 1002 of a CPM data acquisition module 1000 may perform the operations of 2216 (e.g., to generate a high-resolution image of the second portion of the specimen in accordance with the second mask).

Figure 9:
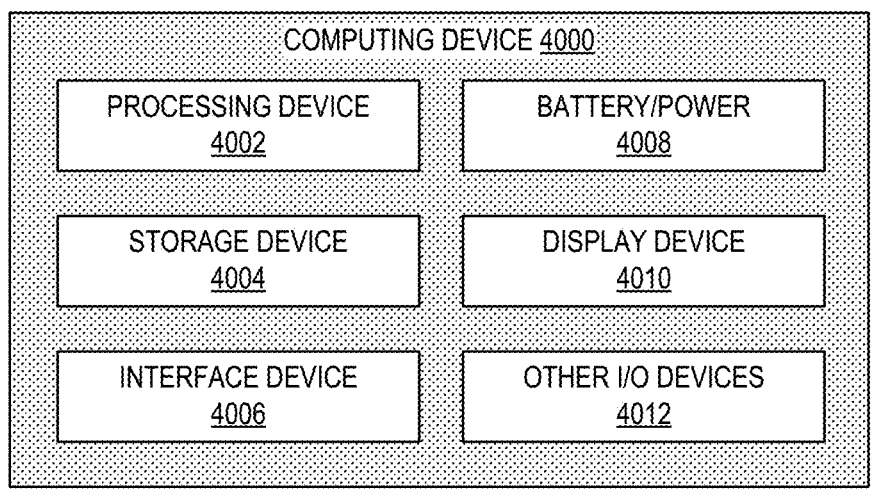
FIG. 9 is a block diagram of an example computing device that may perform some or all of the CPM data acquisition methods disclosed herein, in accordance with various embodiments.
Figure 10:
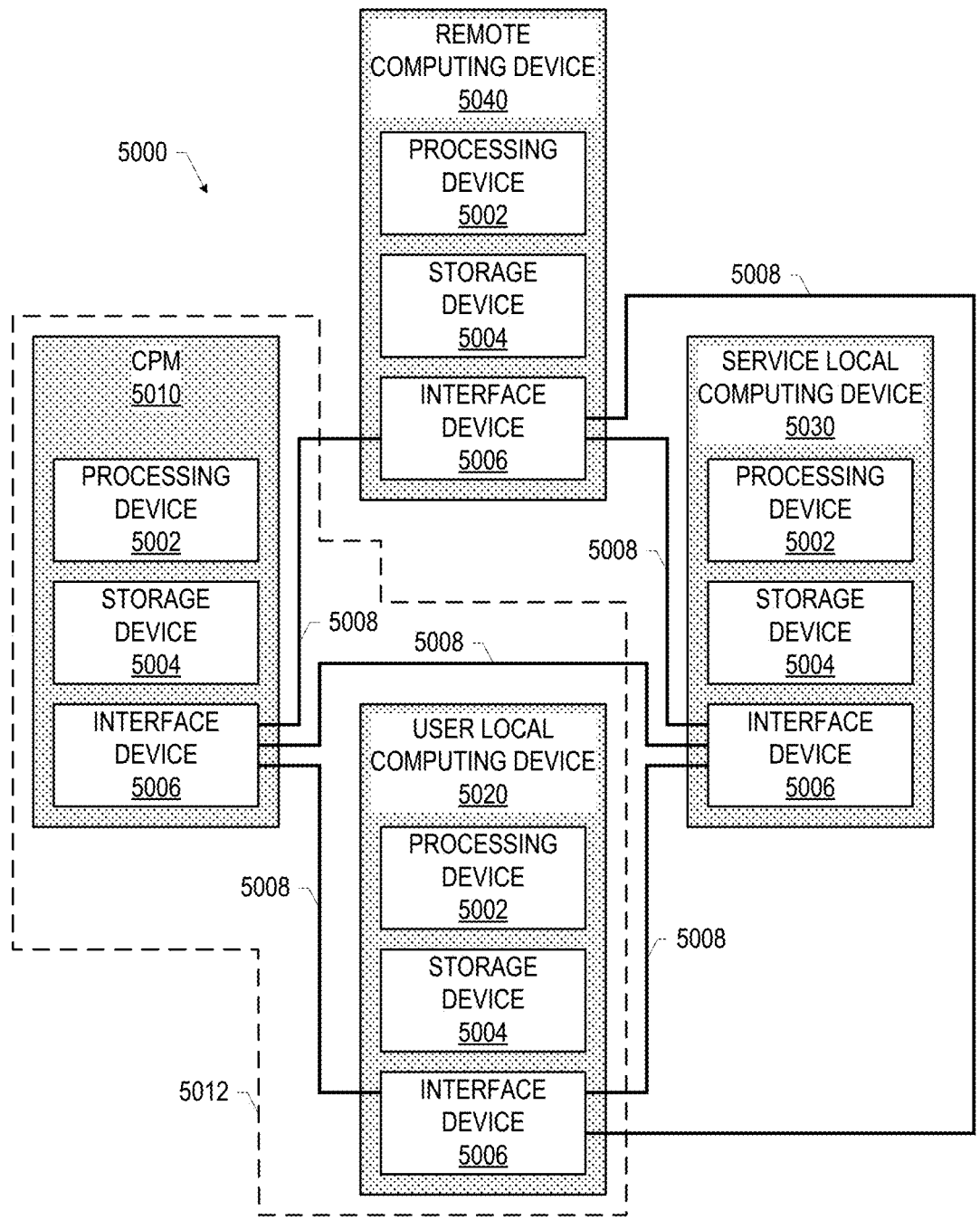
FIG. 10 is a block diagram of an example scientific instrument support system in which some or all of the CPM data acquisition methods disclosed herein may be performed, in accordance with various embodiments.

The CPM data acquisition methods disclosed herein may include interactions with a human user (e.g., via the user local computing device 5020 discussed herein with reference to FIG. 10). These interactions may include providing information to the user (e.g., information regarding the operation of a CPM such as the CPM 5010 of FIG. 10, information regarding a specimen being analyzed or other test or measurement performed by a CPM or other scientific instrument, information retrieved from a local or remote database, or other information) or providing an option for a user to input commands (e.g., to control the operation of a scientific instrument such as the CPM 5010 of FIG. 10, or to control the analysis of data generated by a CPM or other scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 9) that provides outputs to the user and/or prompts the user to provide inputs (e.g., via one or more input devices, such as a keyboard, mouse, trackpad, or touchscreen, included in the other I/O devices 4012 discussed herein with reference to FIG. 9). The CPM data acquisition systems, and scientific instrument support systems more generally, disclosed herein may include any suitable GUIs for interaction with a user.

Figure 8:
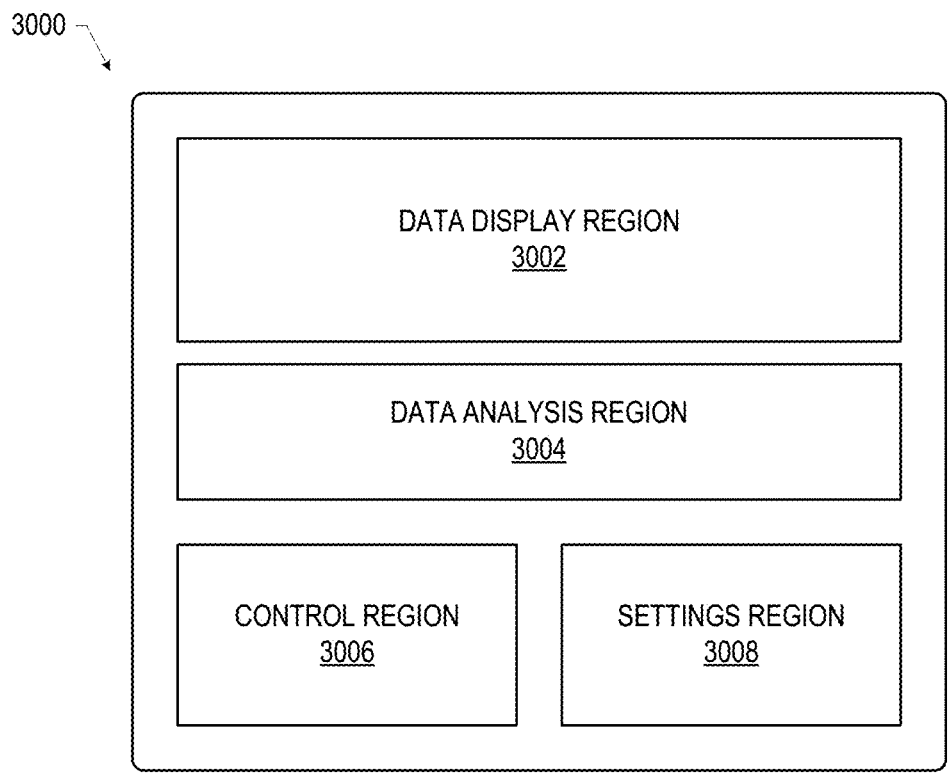
FIG. 8 is an example of a graphical user interface that may be used in the performance of some or all of the CPM data acquisition methods disclosed herein, in accordance with various embodiments.

FIG. 8 depicts an example GUI 3000 that may be used in the performance of some or all of the CPM data acquisition methods disclosed herein, in accordance with various embodiments. As noted above, the GUI 3000 may be provided on a display device (e.g., the display device 4010 discussed herein with reference to FIG. 9) of a computing device (e.g., the computing device 4000 discussed herein with reference to FIG. 9) of a scientific instrument support system (e.g., the scientific instrument support system 5000 discussed herein with reference to FIG. 10), and a user may interact with the GUI 3000 using any suitable input device (e.g., any of the input devices included in the other I/O devices 4012 discussed herein with reference to FIG. 9) and input technique (e.g., movement of a cursor, motion capture, facial recognition, gesture detection, voice recognition, actuation of buttons, etc.).

The GUI 3000 may include a data display region 3002, a data analysis region 3004, a CPM control region 3006, and a settings region 3008. The particular number and arrangement of regions depicted in FIG. 8 is simply illustrative, and any number and arrangement of regions, including any desired features, may be included in a GUI 3000.

The data display region 3002 may display data generated by a CPM (e.g., the CPM 5010 discussed herein with reference to FIG. 10). For example, the data display region 3002 may display any of the low-resolution images, high-resolution images, or combined images disclosed herein (e.g., any of the graphical representations 102-110 of FIGS. 3A-3E).

The data analysis region 3004 may display the results of data analysis (e.g., the results of analyzing the data illustrated in the data display region 3002 and/or other data). For example, the data analysis region 3004 may display regions-of-interest indicated by user, regions-of-interest generated by a machine-learning computational model of the mask logic 1004, and/or a mask generated by the mask logic 1004 (e.g., any of the graphical representations 112 and 114 of FIGS. 4A-4B. In some embodiments, the data display region 3002 and the data analysis region 3004 may be combined in the GUI 3000 (e.g., to include data output from a scientific instrument, and some analysis of the data, in a common graph or region).

The CPM control region 3006 may include options that allow the user to control a scientific instrument (e.g., the CPM 5010 discussed herein with reference to FIG. 10). For example, the CPM control region 3006 may include user-selectable options to manually annotate a low-resolution image to serve as training data; retrain a machine-learning computational model; accept, reject, or correct a proposed mask generated by the mask logic 1004 to control the regions to be imaged with a high-resolution imaging round); or perform other control functions.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 9, sending data to another user, labeling data, etc.).

As noted above, the CPM data acquisition module 1000 may be implemented by one or more computing devices. FIG. 9 is a block diagram of a computing device 4000 that may perform some or all of the CPM data acquisition methods and other scientific instrument support methods disclosed herein, in accordance with various embodiments. In some embodiments, the CPM data acquisition module 1000 may be implemented by a single computing device 4000 or by multiple computing devices 4000. Further, as discussed below, a computing device 4000 (or multiple computing devices 4000) that implements the CPM data acquisition module 1000 may be part of one or more of the CPM 5010, the user local computing device 5020, the service local computing device 5030, or the remote computing device 5040 of FIG. 10.

The computing device 4000 of FIG. 9 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 9, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the CPM data acquisition modules or methods disclosed herein may be part of a scientific instrument support system. FIG. 10 is a block diagram of an example scientific instrument support system 5000 in which some or all of the scientific instrument support methods (e.g., the CPM data acquisition methods) disclosed herein may be performed, in accordance with various embodiments. The CPM data acquisition modules and methods disclosed herein (e.g., the CPM data acquisition module 1000 of FIG. 2 and the methods 2000, 2100, and 2200 of FIGS. 5, 6, and 7, respectively) may be implemented by one or more of the CPM 5010, the user local computing device 5020, the service local computing device 5030, or the remote computing device 5040 of the scientific instrument support system 5000.

Any of the CPM 5010, the user local computing device 5020, the service local computing device 5030, or the remote computing device 5040 may include any of the embodiments of the computing device 4000 discussed herein with reference to FIG. 9, and any of the CPM 5010, the user local computing device 5020, the service local computing device 5030, or the remote computing device 5040 may take the form of any appropriate ones of the embodiments of the computing device 4000 discussed herein with reference to FIG. 9.

The CPM 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the CPM 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the CPM 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the CPM 5010, the user local computing device 5020, the service local computing device 5030, or the remote computing device 5040 may take the same form or different forms.

The CPM 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 9). The particular scientific instrument support system 5000 depicted in FIG. 10 includes communication pathways between each pair of the CPM 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the CPM 5010, but may instead communicate with the CPM 5010 via the communication pathway 5008 between the service local computing device 5030 and the user local computing device 5020 and the communication pathway 5008 between the user local computing device 5020 and the CPM 5010. The CPM 5010 may include any appropriate CPM, such as a SEM, a TEM, a STEM, or an ion beam microscope.

The user local computing device 5020 may be a computing device (e.g., in accordance with any of the embodiments of the computing device 4000 discussed herein) that is local to a user of the CPM 5010. In some embodiments, the user local computing device 5020 may also be local to the CPM 5010, but this need not be the case; for example, a user local computing device 5020 that is in a user's home or office may be remote from, but in communication with, the CPM 5010 so that the user may use the user local computing device 5020 to control and/or access data from the CPM 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the CPM 5010. For example, the service local computing device 5030 may be local to a manufacturer of the CPM 5010 or to a third-party service company. In some embodiments, the service local computing device 5030 may communicate with the CPM 5010, the user local computing device 5020, and/or the remote computing device 5040 (e.g., via a direct communication pathway 5008 or via multiple "indirect" communication pathways 5008, as discussed above) to receive data regarding the operation of the CPM 5010, the user local computing device 5020, and/or the remote computing device 5040 (e.g., the results of self-tests of the CPM 5010, calibration coefficients used by the CPM 5010, the measurements of sensors associated with the CPM 5010, etc.). In some embodiments, the service local computing device 5030 may communicate with the CPM 5010, the user local computing device 5020, and/or the remote computing device 5040 (e.g., via a direct communication pathway 5008 or via multiple "indirect" communication pathways 5008, as discussed above) to transmit data to the CPM 5010, the user local computing device 5020, and/or the remote computing device 5040 (e.g., to update programmed instructions, such as firmware, in the CPM 5010, to initiate the performance of test or calibration sequences in the CPM 5010, to update programmed instructions, such as software, in the user local computing device 5020 or the remote computing device 5040, etc.). A user of the CPM 5010 may utilize the CPM 5010 or the user local computing device 5020 to communicate with the service local computing device 5030 to report a problem with the CPM 5010 or the user local computing device 5020, to request a visit from a technician to improve the operation of the CPM 5010, to order consumables or replacement parts associated with the CPM 5010, or for other purposes.

The remote computing device 5040 may be a computing device (e.g., in accordance with any of the embodiments of the computing device 4000 discussed herein) that is remote from the CPM 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the CPM 5010, perform analyses of the data generated by the CPM 5010 (e.g., in accordance with programmed instructions), facilitate communication between the user local computing device 5020 and the CPM 5010, and/or facilitate communication between the service local computing device 5030 and the CPM 5010.

In some embodiments, one or more of the elements of the scientific instrument support system 5000 illustrated in FIG. 10 may not be present. Further, in some embodiments, multiple ones of various ones of the elements of the scientific instrument support system 5000 of FIG. 10 may be present. For example, a scientific instrument support system 5000 may include multiple user local computing devices 5020 (e.g., different user local computing devices 5020 associated with different users or in different locations). In another example, a scientific instrument support system 5000 may include multiple CPMs 5010, all in communication with service local computing device 5030 and/or a remote computing device 5040; in such an embodiment, the service local computing device 5030 may monitor these multiple CPMs 5010, and the service local computing device 5030 may cause updates or other information may be "broadcast" to multiple scientific instruments 5010 at the same time. Different ones of the CPMs 5010 or other scientific instruments in a scientific instrument support system 5000 may be located close to one another (e.g., in the same room) or farther from one another (e.g., on different floors of a building, in different buildings, in different cities, etc.). In some embodiments, a CPM 5010 may be connected to an Internet-of-Things (IoT) stack that allows for command and control of the CPM 5010 through a web-based application, a virtual or augmented reality application, a mobile application, and/or a desktop application. Any of these applications may be accessed by a user operating the user local computing device 5020 in communication with the CPM 5010 by the intervening remote computing device 5040. In some embodiments, a CPM 5010 may be sold by the manufacturer along with one or more associated user local computing devices 5020 as part of a local scientific instrument computing unit 5012.

The following paragraphs provide various examples of the embodiments disclosed herein.

Example 1 is a charged particle microscope support apparatus, including: first logic to cause a charged particle microscope to generate a single image of a first portion of a specimen; second logic to generate a first mask based on one or more regions-of-interest provided by user annotation of the single image; and third logic to train a machine-learning computational model using the single image and the one or more regions-of-interest; wherein: the first logic is to cause the charged particle microscope to generate a plurality of images of a corresponding plurality of additional portions of the specimen; and the second logic is to, after the machine-learning computational model is trained using the single image and the one or more regions-of-interest, generate a plurality of masks based on the corresponding images of the additional portions of the specimen using the machine-learning computational model without retraining.

Example 2 includes the subject matter of Example 1, and further specifies that the charged particle microscope includes an electron microscope, an ion microscope, or a dual beam microscope.

Example 3 includes the subject matter of any of Examples 1-2, and further specifies that the first logic is to, after generation of the first mask, cause the charged particle microscope to generate an other image of the first portion of the specimen in accordance with the first mask.

Example 4 includes the subject matter of Example 3, and further specifies that a resolution of the single image of the first portion of the specimen is less than a resolution of the other image of the first portion of the specimen.

Example 5 includes the subject matter of any of Examples 3-4, and further specifies that an acquisition time of the single image of the first portion is less than an acquisition time of the other image of the first portion of the specimen.

Example 6 includes the subject matter of any of Examples 3-5, and further specifies that a detector associated with the single image of the first portion is different than a detector associated with the other image of the first portion of the specimen.

Example 7 includes the subject matter of any of Examples 3-6, and further specifies that a radiation dose to the specimen associated with the single image of the first portion is less than a radiation dose to the specimen associated with the other image of the first portion of the specimen.

Example 8 includes the subject matter of any of Examples 3-7, and further specifies that the other image includes electron backscatter diffraction (EBD) data or energy-dispersive x-ray spectroscopy (EDS) data.

Example 9 includes the subject matter of any of Examples 3-7, and further includes: fourth logic to combine the single image and the other image into a combined image representative of the first portion of the specimen, and to provide the combined image for display by a display device.

Example 10 includes the subject matter of any of Examples 3-9, and further specifies that the first logic is to, after generation of the plurality of masks, cause the charged particle microscope to generate a plurality of other images of the corresponding additional portions of the specimen in accordance with the corresponding plurality of masks.

Example 11 includes the subject matter of any of Examples 1-10, and further specifies that 1) the first portion of the specimen represent a plane through the specimen, and the plurality of additional portions of the specimen represent a plurality of parallel planes through the specimen, or 2) the first portion of the specimen represents a plane through the specimen, and the plurality of additional portions of the specimen represent a plurality of planes through the specimen at different angles.

Example 12 includes the subject matter of any of Examples 1-11, and further includes: fourth logic to generate a three-dimensional image of the specimen using images captured in accordance with the masks.

Example 13 includes the subject matter of any of Examples 1-12, and further specifies that the second logic is to: provide the single image of the first portion of the specimen for display on a display device; and receive, from a user, an indication of one or more regions-of-interest by user annotations of the displayed single image.

Example 14 includes the subject matter of any of Examples 1-13, and further specifies that the plurality of additional portions of the specimen are adjacent planes through at least a portion of the specimen.

Example 15 includes the subject matter of any of Examples 1-14, and further specifies that the first portion of the specimen is adjacent to a closest one of the plurality of additional portions of the specimen.

Example 16 includes the subject matter of any of Examples 1-15, and further specifies that the first portion of the specimen is spaced apart from a closest one of the plurality of additional portions of the specimen by a distance between 1 micron and 30 microns.

Example 17 includes the subject matter of Example 16, and further specifies that the first portion of the specimen and the closest one of the plurality of additional portions of the specimen are spaced apart in the (z)-direction.

Example 18 includes the subject matter of any of Examples 16-17, and further specifies that the first portion of the specimen is spaced apart from the closest one of the plurality of additional portions of the specimen by a distance between 1 micron and 10 microns.

Example 19 includes the subject matter of Example 18, and further specifies that the first portion of the specimen and the closest one of the plurality of additional portions of the specimen are different milled portions of the specimen.

Example 20 includes the subject matter of any of Examples 16-17, and further specifies that the first portion of the specimen is spaced apart from the closest one of the plurality of additional portions of the specimen by a distance between 10 microns and 30 microns.

Example 21 includes the subject matter of Example 20, and further specifies that the first portion of the specimen and the closest one of the plurality of additional portions of the specimen are different mechanically sliced portions of the specimen.

Example 22 includes the subject matter of any of Examples 1-21, and further specifies that no additional user annotation of regions-of-interest in an image is received before the plurality of masks are generated.

Example 23 includes the subject matter of any of Examples 1-22, and further specifies that, before the machine-learning computational model is trained using the single image and the one or more regions-of-interest, the machine-learning computational model is trained using a training corpus that does not include images of the specimen.

Example 24 includes the subject matter of Example 23, and further specifies that the specimen includes a biological sample, and the training corpus does not include any images of a similar biological sample.

Example 25 includes the subject matter of any of Examples 23-24, and further specifies that the regions-of-interest include a feature-of-interest, and the training corpus does not include any examples of the feature-of-interest.

Example 26 includes the subject matter of any of Examples 1-25, and further specifies that the second logic is to compare the masks associated with adjacent portions of the specimen and, when differences between the masks meet one or more difference criteria, adjust one or more of the masks.

Example 27 includes the subject matter of Example 26, and further specifies that adjustment of one or more of the masks includes increasing a size of a region to be imaged in accordance with one or more of the masks.

Example 28 includes the subject matter of any of Examples 26-27, and further specifies that the second logic is to, when differences between the masks meet one or more difference criteria, prompt a user to annotate an other image of the specimen with one or more regions-of-interest.

Example 29 includes the subject matter of Example 28, and further specifies that the third logic is to train the machine-learning computational model using the other image and the one or more regions-of-interest of the other image.

Example 30 includes the subject matter of any of Examples 26-29, and further specifies that the second logic is to, when differences between the masks meet one or more difference criteria, prompt a user to accept or reject one or more of the masks.

Example 31 includes the subject matter of any of Examples 1-30, and further specifies that the machine-learning computational model includes a multi-layer neural network model.

Example 32 includes the subject matter of any of Examples 1-31, and further specifies that the first mask indicates to image the regions-of-interest.

Example 33 includes the subject matter of Example 32, and further specifies that the first mask indicates to image the regions-of-interest and regions around the regions-of-interest.

Example 34 includes the subject matter of any of Examples 1-33, and further includes: the charged particle microscope.

Example 35 includes the subject matter of any of Examples 1-34, and further specifies that the first portion of the specimen and at least one of the additional portions of the specimen have a same set of (x,y) coordinates and a different (z) coordinate.

Example 36 is a charged particle microscope support apparatus, including: first logic to cause a charged particle microscope to generate a single image of a first portion of a specimen; second logic to generate a first mask based on one or more regions-of-interest indicated by user annotation of the single image, wherein the regions-of-interest include a feature-of-interest in the specimen; and third logic to train a machine-learning computational model using the single image and the one or more regions-of-interest; wherein: the first logic is to cause the charged particle microscope to generate an image of a second portion of the specimen, wherein the second portion of the specimen is proximate to the first portion of the specimen; and the second logic is to, after the machine-learning computational model is trained using the single image and the one or more regions-of-interest, generate a second mask based on the image of the second portion of the specimen using the machine-learning computational model, wherein the second mask indicates to image regions of the second portion of the specimen including the feature-of-interest and regions of the second portion of the specimen that do not include the feature-of-interest.

Example 37 includes the subject matter of Example 36, and further specifies that the charged particle microscope includes an electron microscope, an ion microscope, or a dual beam microscope.

Example 38 includes the subject matter of any of Examples 36-37, and further specifies that the first logic is to, after generation of the first mask, cause the charged particle microscope to generate an other image of the first portion of the specimen in accordance with the first mask.

Example 39 includes the subject matter of Example 38, and further specifies that a resolution of the single image of the first portion of the specimen is less than a resolution of the other image of the first portion of the specimen.

Example 40 includes the subject matter of any of Examples 38-39, and further specifies that an acquisition time of the single image of the first portion is less than an acquisition time of the other image of the first portion of the specimen.

Example 41 includes the subject matter of any of Examples 38-40, and further specifies that a detector associated with the single image of the first portion is different than a detector associated with the other image of the first portion of the specimen.

Example 42 includes the subject matter of any of Examples 38-41, and further specifies that a radiation dose to the specimen associated with the single image of the first portion is less than a radiation dose to the specimen associated with the other image of the first portion of the specimen.

Example 43 includes the subject matter of any of Examples 38-42, and further specifies that the other image includes electron backscatter diffraction (EBD) data or energy-dispersive x-ray spectroscopy (EDS) data.

Example 44 includes the subject matter of any of Examples 38-43, and further includes: fourth logic to combine the single image and the other image into a combined image representative of the first portion of the specimen, and to provide the combined image for display by a display device.

Example 45 includes the subject matter of any of Examples 38-44, and further specifies that the other image is a first other image, and the first logic is to, after generation of the second mask, cause the charged particle microscope to generate a second other image of the second portion of the specimen in accordance with the second mask.

Example 46 includes the subject matter of any of Examples 36-45, and further specifies that 1) the first portion of the specimen represents a plane through the specimen and the second portion of the specimen represents a parallel plane through the specimen, or 2) the first portion of the specimen represents a plane through the specimen and the second portion of the specimen represent a plane through the specimen at a different angle.

Example 47 includes the subject matter of any of Examples 46, and further specifies that the first portion of the specimen and the second portion of the specimen are adjacent milled or mechanically sliced portions of the specimen.

Example 48 includes the subject matter of any of Examples 36-47, and further includes: fourth logic to generate a three-dimensional image of the specimen using images captured in accordance with the masks.

Example 49 includes the subject matter of any of Examples 36-48, and further specifies that the second logic is to: provide the single image of the first portion of the specimen for display on a display device; and receive, from a user, an indication of one or more regions-of-interest by user annotations of the displayed single image.

Example 50 includes the subject matter of any of Examples 36-49, and further specifies that the first portion of the specimen is spaced apart from the second portion of the specimen by a distance between 1 micron and 30 microns.

Example 51 includes the subject matter of Example 50, and further specifies that the first portion of the specimen and the second portion of the specimen are spaced apart in the (z)-direction.

Example 52 includes the subject matter of any of Examples 50-51, and further specifies that the first portion of the specimen is spaced apart from the second portion of the specimen by a distance between 1 micron and 10 microns.

Example 53 includes the subject matter of Example 52, and further specifies that the first portion of the specimen and the second portion of the specimen are different milled portions of the specimen.

Example 54 includes the subject matter of any of Examples 50-51, and further specifies that the first portion of the specimen is spaced apart from the second portion of the specimen by a distance between 10 microns and 30 microns.

Example 55 includes the subject matter of Example 54, and further specifies that the first portion of the specimen and the second portion of the specimen are different mechanically sliced portions of the specimen.

Example 56 includes the subject matter of any of Examples 36-55, and further specifies that no additional user annotation of regions-of-interest in an image is received before the second mask is generated.

Example 57 includes the subject matter of any of Examples 36-56, and further specifies that, before the machine-learning computational model is trained using the single image and the one or more regions-of-interest, the machine-learning computational model is trained using a training corpus that does not include images of the specimen.

Example 58 includes the subject matter of Example 57, and further specifies that the specimen includes a biological sample, and the training corpus does not include any images of a similar biological sample.

Example 59 includes the subject matter of any of Examples 57-58, and further specifies that the training corpus does not include any examples of the feature-of-interest.

Example 60 includes the subject matter of any of Examples 36-59, and further specifies that the second logic is to compare the first and second masks and, when differences between the masks meet one or more difference criteria, adjust the second mask.

Example 61 includes the subject matter of Example 60, and further specifies that adjustment of one or more of the masks includes increasing a size of a region to be imaged in accordance with the second mask.

Example 62 includes the subject matter of any of Examples 60-61, and further specifies that the second logic is to, when differences between the masks meet one or more difference criteria, prompt a user to annotate an other image of the specimen with one or more regions-of-interest.

Example 63 includes the subject matter of Example 62, and further specifies that the third logic is to train the machine-learning computational model using the other image and the one or more regions-of-interest of the other image.

Example 64 includes the subject matter of any of Examples 60-63, and further specifies that the second logic is to, when differences between the first and second masks meet one or more difference criteria, prompt a user to accept or reject the second mask.

Example 65 includes the subject matter of any of Examples 36-64, and further specifies that the machine-learning computational model includes a multi-layer neural network model.

Example 66 includes the subject matter of any of Examples 36-65, and further specifies that the first mask indicates to image the regions-of-interest.

Example 67 includes the subject matter of Example 66, and further specifies that the first mask indicates to image the regions-of-interest and regions around the regions-of-interest.

Example 68 includes the subject matter of any of Examples 36-67, and further includes: the charged particle microscope.

Example 69 includes the subject matter of any of Examples 36-68, and further specifies that the first portion of the specimen and the second portion of the specimen have a same set of (x,y) coordinates and a different (z) coordinate.

Example 70 is a charged particle microscope support apparatus, including: first logic to generate a first data set associated with a first portion of a specimen by processing data from a first imaging round of the first portion by a charged particle microscope; second logic to generate, based on a user identification of one or more first regions-of-interest in the first data set associated with the first portion of the specimen, a first mask associated with the first portion of the specimen; and third logic to train a machine-learning computational model using the first data set associated with the first portion of the specimen and the one or more first regions-of-interest; wherein: the first logic is to generate a first data set associated with a second portion of the specimen by processing data from a first imaging round of the second portion by the charged particle microscope; the second logic is to, after the machine-learning computational model is trained using the first data set associated with the first portion of the specimen and the one or more first regions-of-interest, generate a second mask associated with the second portion of the specimen using the machine-learning computational model and the first data set associated with the second portion of the specimen; the first logic is to generate a second data set associated with the first portion of the specimen by processing data from a second imaging round, in accordance with the first mask, of the first portion by the charged particle microscope; the second logic is to, when differences between the first mask and the second mask, or differences between the first data set associated with the first portion of the specimen and the first data set associated with the second portion of the specimen, meet one or more difference criteria, adjust the second mask before a second data set associated with the second portion of the specimen in accordance with the second mask is generated; and the first logic is to generate a second data set associated with the second portion of the specimen by processing data from a second imaging round, in accordance with the second mask, of the second portion by the charged particle microscope.

Example 71 includes the subject matter of Example 70, and further specifies that the charged particle microscope includes an electron microscope, an ion microscope, or a dual beam microscope.

Example 72 includes the subject matter of any of Examples 70-71, and further specifies that a resolution of the first imaging round of the first portion of the specimen is less than a resolution of the second imaging round of the first portion of the specimen.

Example 73 includes the subject matter of any of Examples 70-72, and further specifies that an acquisition time of the first imaging round of the first portion is less than an acquisition time of the second imaging round of the first portion of the specimen.

Example 74 includes the subject matter of any of Examples 70-73, and further specifies that a detector associated with the first imaging round of the first portion is different than a detector associated with the second imaging round of the first portion of the specimen.

Example 75 includes the subject matter of any of Examples 70-74, and further specifies that a radiation dose to the specimen during the first imaging round of the first portion is less than a radiation dose to the specimen during the second imaging round of the first portion of the specimen.

Example 76 includes the subject matter of any of Examples 70-75, and further specifies that the second data set associated with the first portion of the specimen includes electron backscatter diffraction (EBD) data or energy-dispersive x-ray spectroscopy (EDS) data.

Example 77 includes the subject matter of any of Examples 70-76, and further includes: fourth logic to combine the first data set associated with the second portion of the specimen and the second data set associated with the second portion of the specimen into a combined image representative of the second portion of the specimen, and to provide the combined image for display by a display device.

Example 78 includes the subject matter of any of Examples 70-77, and further specifies that 1) the first portion of the specimen represents a plane through the specimen, and the second portion of the specimen represents a parallel plane through the specimen, or 2) the first portion of the specimen represents a plane through the specimen and the second portion of the specimen represent a plane through the specimen at a different angle.

Example 79 includes the subject matter of any of Examples 70-78, and further includes: fourth logic to generate a three-dimensional image of the specimen using the second data sets.

Example 80 includes the subject matter of any of Examples 70-79, and further specifies that the second logic is to: provide the first data set associated with the first portion of the specimen for display on a display device; and receive, from a user, an indication of one or more regions-of-interest by user annotations of the displayed first data set.

Example 81 includes the subject matter of any of Examples 70-80, and further specifies that the first portion of the specimen is spaced apart from the second portion of the specimen by a distance between 1 micron and 30 microns.

Example 82 includes the subject matter of Example 81, and further specifies that the first portion of the specimen and the second portion of the specimen are spaced apart in the (z)-direction.

Example 83 includes the subject matter of any of Examples 81-82, and further specifies that the first portion of the specimen is spaced apart from the second portion of the specimen by a distance between 1 micron and 10 microns.

Example 84 includes the subject matter of Example 83, and further specifies that the first portion of the specimen and the second portion of the specimen are different milled portions of the specimen.

Example 85 includes the subject matter of any of Examples 81-82, and further specifies that the first portion of the specimen is spaced apart from the second portion of the specimen by a distance between 10 microns and 30 microns.

Example 86 includes the subject matter of Example 85, and further specifies that the first portion of the specimen and the second portion of the specimen are different mechanically sliced portions of the specimen.

Example 87 includes the subject matter of any of Examples 70-86, and further specifies that no additional user annotation of regions-of-interest in data sets associated with the specimen is received before the second mask is generated.

Example 88 includes the subject matter of any of Examples 70-87, and further specifies that, before the machine-learning computational model is trained using the first data set associated with the first portion of the specimen and the one or more first regions-of-interest, the machine-learning computational model is trained using a training corpus that does not include images of the specimen.

Example 89 includes the subject matter of Example 88, and further specifies that the specimen includes a biological sample, and the training corpus does not include any images of a similar biological sample.

Example 90 includes the subject matter of any of Examples 88-89, and further specifies that the regions-of-interest include a feature-of-interest, and the training corpus does not include any examples of the feature-of-interest.

Example 91 includes the subject matter of any of Examples 70-90, and further specifies that adjustment of the second mask includes increasing a size of a region to be imaged in accordance with the second mask.

Example 92 includes the subject matter of any of Examples 70-91, and further specifies that the second logic is to, when differences between the first mask and the second mask meet one or more difference criteria, prompt a user to accept or reject the second mask.

Example 93 includes the subject matter of any of Examples 70-92, and further specifies that the machine-learning computational model includes a multi-layer neural network model.

Example 94 includes the subject matter of any of Examples 70-93, and further specifies that the first mask indicates to image the regions-of-interest.

Example 95 includes the subject matter of any of Examples 94, and further specifies that the first mask indicates to image the regions-of-interest and regions around the regions-of-interest.

Example 96 includes the subject matter of any of Examples 70-95, and further includes: the charged particle microscope.

Example 97 includes the subject matter of any of Examples 70-96, and further specifies that the first portion of the specimen and the second portion of the specimen have a same set of (x,y) coordinates and a different (z) coordinate.

Example 98 includes any of the CPM data acquisition modules disclosed herein.

Example 99 includes any of the methods disclosed herein.

Example 100 includes any of the GUIs disclosed herein.

Example 101 includes any of the scientific instrument support computing devices and systems disclosed herein.

The invention claimed is:

1. A charged particle microscope support apparatus, comprising:
    first logic to cause a charged particle microscope to generate a single image of a first portion of a specimen;
    second logic to generate a first mask based on one or more regions-of-interest provided by user annotation of the single image; and
    third logic to train a machine-learning computational model using the single image and the one or more regions-of-interest;
    wherein:
        the first logic is to cause the charged particle microscope to generate a plurality of images of a corresponding plurality of additional portions of the specimen; and
        the second logic is to, after the machine-learning computational model is trained using the single image and the one or more regions-of-interest, generate a plurality of masks based on the corresponding images of the additional portions of the specimen using the machine-learning computational model without retraining.

2. The charged particle microscope support apparatus of claim 1, wherein the first logic is to, after generation of the first mask, cause the charged particle microscope to generate an other image of the first portion of the specimen in accordance with the first mask.

3. The charged particle microscope support apparatus of claim 2, wherein a resolution of the single image of the first portion of the specimen is less than a resolution of the other image of the first portion of the specimen.

4. The charged particle microscope support apparatus of claim 2, wherein an acquisition time of the single image of the first portion is less than an acquisition time of the other image of the first portion of the specimen.

5. The charged particle microscope support apparatus of claim 2, further comprising:
    fourth logic to combine the single image and the other image into a combined image representative of the first portion of the specimen, and to provide the combined image for display by a display device.

6. The charged particle microscope support apparatus of claim 1, wherein 1) the first portion of the specimen represents a plane through the specimen, and the plurality of additional portions of the specimen represent a plurality of parallel planes through the specimen, or 2) the first portion of the specimen represents a plane through the specimen, and the plurality of additional portions of the specimen represent a plurality of planes through the specimen at different angles.

7. The charged particle microscope support apparatus of claim 1, wherein the second logic is to:
    provide the single image of the first portion of the specimen for display on a display device; and
    receive, from a user, an indication of one or more regions-of-interest by user annotations of the displayed single image.

8. The charged particle microscope support apparatus of claim 1, wherein the second logic is to compare the masks associated with adjacent portions of the specimen and, when differences between the masks meet one or more difference criteria, adjust one or more of the masks.

9. A charged particle microscope support apparatus, comprising:
    first logic to cause a charged particle microscope to generate a single image of a first portion of a specimen;
    second logic to generate a first mask based on one or more regions-of-interest indicated by user annotation of the single image, wherein the regions-of-interest include a feature-of-interest in the specimen; and
    third logic to train a machine-learning computational model using the single image and the one or more regions-of-interest;
    wherein:

the first logic is to cause the charged particle microscope to generate an image of a second portion of the specimen, wherein the second portion of the specimen is proximate to the first portion of the specimen; and the second logic is to, after the machine-learning computational model is trained using the single image and the one or more regions-of-interest, generate a second mask based on the image of the second portion of the specimen using the machine-learning computational model, wherein the second mask indicates to image regions of the second portion of the specimen including the feature-of-interest and regions of the second portion of the specimen that do not include the feature-of-interest.

10. The charged particle microscope support apparatus of claim 9, further comprising:

fourth logic to generate a three-dimensional image of the specimen using images captured in accordance with the masks.

11. The charged particle microscope support apparatus of claim 9, wherein the first portion of the specimen is spaced apart from the second portion of the specimen by a distance between 1 micron and 30 microns.

12. The charged particle microscope support apparatus of claim 11, wherein the first portion of the specimen and the second portion of the specimen are spaced apart in the (z)-direction.

13. The charged particle microscope support apparatus of claim 9, wherein, before the machine-learning computational model is trained using the single image and the one or more regions-of-interest, the machine-learning computational model is trained using a training corpus that does not include images of the specimen.

14. The charged particle microscope support apparatus of claim 13, wherein the training corpus does not include any examples of the feature-of-interest.

15. The charged particle microscope support apparatus of claim 9, wherein the second logic is to compare the first and second masks and, when differences between the masks meet one or more difference criteria, adjust the second mask.

* * * * *